United States Patent
Winter et al.

(10) Patent No.: US 7,722,696 B2
(45) Date of Patent: May 25, 2010

(54) COATED GRANULAR SUBSTANCES

(75) Inventors: Reinhard Winter, Wülfrath (DE); Christian Priebe, Wülfrath (DE); Peter Kuhlmann, Wülfrath (DE)

(73) Assignee: Ashland-Sudchemie-Kernfest GmbH, Hilden (DE)

( * ) Notice: Subject to any disclaimer, the term of this patent is extended or adjusted under 35 U.S.C. 154(b) by 1384 days.

(21) Appl. No.: 10/497,196

(22) PCT Filed: Nov. 27, 2002

(86) PCT No.: PCT/DE02/04352

§ 371 (c)(1), (2), (4) Date: May 27, 2004

(87) PCT Pub. No.: WO03/048075

PCT Pub. Date: Jun. 12, 2003

(65) Prior Publication Data

US 2005/0005661 A1    Jan. 13, 2005

(30) Foreign Application Priority Data

Nov. 29, 2001    (DE) ................................. 101 58 693

(51) Int. Cl.
*A01N 25/00* (2006.01)
*A61K 9/50* (2006.01)

(52) U.S. Cl. .................................... 71/64.02; 424/490
(58) Field of Classification Search ................. 71/64.02; 424/490

See application file for complete search history.

(56) References Cited

U.S. PATENT DOCUMENTS

| | | | |
|---|---|---|---|
| 1,950,085 A * | 3/1934 | Harvey | ....................... 514/731 |
| 3,285,223 A | 11/1966 | Sahlin | |
| 4,554,188 A * | 11/1985 | Holubka et al. | .......... 427/393.5 |
| 4,772,490 A | 9/1988 | Kogler et al. | |
| 6,045,810 A | 4/2000 | Moore | ....................... 424/400 |
| 6,229,054 B1 * | 5/2001 | Dai et al. | .................... 568/630 |
| 6,358,295 B1 | 3/2002 | Tabei et al. | ................. 71/64.02 |
| 7,393,465 B2 | 7/2008 | Niesten et al. | |

2008/0139685 A1    6/2008    Reese et al.

FOREIGN PATENT DOCUMENTS

| | | |
|---|---|---|
| AU | B-12282/97 | 8/1998 |
| DE | 1242573 | 12/1964 |
| DE | 3544451 | 12/1985 |
| DE | 3544451 | 1/1987 |
| EP | 0230601 | 11/1992 |
| EP | 0974568 | 7/2000 |
| JP | 31-442 | 1/1956 |
| JP | 48-29530 | 9/1973 |
| JP | 60-23417 | 2/1985 |
| JP | 62-59620 | 3/1987 |
| JP | 62-144784 | 6/1987 |
| JP | 9-202683 | 8/1997 |
| JP | 2001-213685 | 8/2001 |

OTHER PUBLICATIONS 4 pgs, "Cardanol-Glycols and Cardanol-Glycol-Based Polyurethane Films," Ton That Minh Tan, J. Appl. Polym. Sci. 65: 507-510, 1997.
4 pgs, "Cardanol-Lignin-Based Polyurethanes," Ton That Minh Tan, Polymer International vol. 41, No. 1, 1996.

\* cited by examiner

*Primary Examiner*—Robert A Wax
*Assistant Examiner*—Aradhana Sasan
(74) *Attorney, Agent, or Firm*—Kagah Binder, PLLC

(57) ABSTRACT

The invention relates to a coated granular material, wherein the coating is a resin, comprising the reaction producing of at least one compound selected from the group consisting of cardol, cardanol or derivatives or oligomers of these compounds with an isocyanate component, and to a method for the preparation thereof. Water-soluble granular materials are suitable as substances to be coated. Examples of granular substances are fertilizers, crop protection agents, insecticides, pesticides, fungicides, drying agents and mixtures thereof. The substance coated according to the invention has advantageous properties since the resin can be applied in a selective and economical manner to the substrates due to its low tackiness. In particular, coated fertilizer granulates are advantageous in that, with regard to the applied amount of fertilizer, they can provide more nutrients to the plant. In addition, fertilizers can be provided that can provide nutrients to the plant over a longer period of time and continuously and they have an exact and reproducible release behavior according to the type of plant to be treated. Furthermore, the polyol component of the coating can be obtained from the renewable raw material cashew nut oil.

20 Claims, No Drawings

COATED GRANULAR SUBSTANCES

The invention relates to a coated granular material, wherein the coating is a resin, comprising the reaction product of at least one compound selected from the group consisting of cardol, cardanol or derivatives or oligomers of these compounds with an isocyanate component, and to a method for the preparation thereof. Cardol or cardanol and derivatives thereof can be obtained from the renewable raw material cashew nut oil.

It is known to provide granular materials with an albeit water-permeable but water-insoluble coating in order to decrease the dissolution rate and thus extend the duration of their effectiveness. This method has gained particular importance in the field of fertilizers.

DE-A-1 242 573 describes a process for encapsulating granulates by spraying a liquid coating agent thereon. A copolymerisate of dicyclopentadiene with drying or semi-drying oils is proposed as a coating agent. However, carrying out this process requires diluting the coating agent with a volatile solvent to provide a free-flowing consistency in order to allow spraying onto the granulate. The added solvent has to be removed during the process at high temperatures. This results in the release of vapors which are combustible and possibly harmful to the health. Furthermore, the drying period unfavorably adds to the length of time required for a coating process. Overall, both the heating and the cooling processes require a very high amount of energy. The released vapors furthermore necessitate a complicated cleaning process of the exhausts.

WO 96/41779 relates to encapsulated fertilizer granulates that are coated with an ethylene copolymerisate carrying carboxyl groups, wherein the carboxyl groups can also be present in the form of their alkali, alkaline earth or ammonium salts, wherein the ethylene copolymerisate carrying carboxyl groups is composed of a) 75 to 90 wt.-% ethylene and b) 10 to 25 wt.-% of an α-olefinic unsaturated $C_3$-$C_8$ alkyl carboxylic acid, and wherein those coated fertilizer granulates comprising a crop protection agent are excluded. The copolymerisates are applied to the fertilizer granulate in the form of an aqueous solution or an aqueous dispersion. Thus, the use of potentially harmful organic solvents can, on the one hand, be avoided. On the other hand, however, this process has the disadvantage that the water-soluble fertilizer granulate can start to dissolve when the aqueous solution or dispersion of the coating material is applied. For this reason, only a limited amount of the coating material can be added per unit of time during this process. At the same time, it has to be ensured that the water can evaporate quickly in order to avoid complete dissolution of the granulate. Therefore, this process also requires a large amount of energy and a technically complex conduct of the process in order to remove the water added as quickly as possible.

The coating of water-soluble granulates with synthetic resins on the basis of a polyol component and isocyanate has already been described in EP-A-0 230 601. For this purpose, a coating substance is used which is composed of an isocyanate component and a polyol component consisting of a condensation product of phenols and aldehydes, a plasticizer containing hydroxyl groups and optionally a diluting agent containing hydroxyl groups. This mixture can be cured at room temperature with an amine as a catalyst without the application of heat.

This process is distinguished by high efficiency, in particular because it does not require the additional application of heat or a complicated disposal of solvents.

Nonetheless, it is desired to improve the processing properties, such as e.g. the tackiness, of the resin in order to be able to coat granular materials with the substrate selectively and economically. When the coated material is a fertilizer it should be possible to keep the ratio of coating material as low as possible in order to provide the plant with more nutrients, based on the use of a certain amount of a coated fertilizer granulate. Furthermore, it is desirable to be able to design the coated fertilizer in such a manner that depending on the type of plant to be fertilized a specific and reproducible release behavior can be adjusted. Also, it can be regarded as an advantage if the coating material is based on a renewable raw material.

Surprisingly, all the desired advantages can be achieved by coating the granular material with a resin comprising the reaction product of at least one compound selected from the group consisting of cardol, cardanol or derivatives or oligomers thereof (=polyol component) with an isocyanate component. According to the present invention, the resin can be applied in very thin layers and in a controlled fashion on the granular substance to be coated which results in the desired advantages especially in the field of fertilizers. Cardol and cardanol can be obtained from the renewable raw material cashew nut oil.

The amount of coating applied is 3 to 15, preferably 8 to 12 wt.-%, based on the amount of granular substance. The grain size of the granular material to be coated is 1 to 10 mm, preferably 2 to 7 mm and more preferably 3 to 5 mm. The granular substance to be coated can be water-soluble.

According to the present invention, regarding the coating of fertilizers considerably improved release rates compared with uncoated materials or materials coated according to the prior art are for example observed.

Accordingly, the present invention provides a material coated with this resin, a method for the preparation of the coated material, and the use of the resin for coating granular materials as defined in the patent claims.

Cashew nut oil is obtained from the seed of the cashew tree and consists of about 90% anacardic acid and about 10% cardol. A heat treatment under acidic conditions causes decarboxylation and results in cardanol, a substituted phenol, as well as cardol. Cardol and cardanol can be obtained in pure form by distillation. This also results in the formation of oligomers of these compounds which remain at the bottom of the distillation column and can be isolated by means of common measures known to the person skilled in the art.

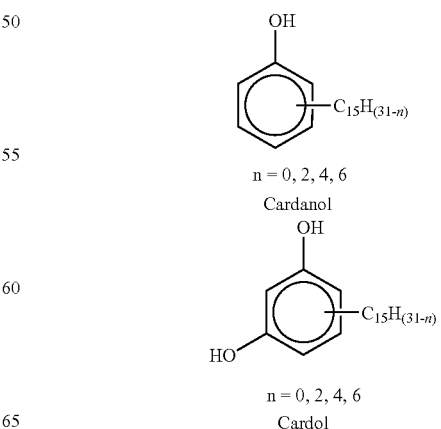

n = 0, 2, 4, 6
Cardanol n = 0, 2, 4, 6
Cardol

According to the present invention, cardol and cadanol obtained from cashew nut oil or mixtures thereof as well as oligomers thereof from the bottom of the distillation column which are available as technical products are for example suitable as starting materials for the reaction with the isocyanate component. Furthermore, derivatives of cardol and/or cardanol can be used as starting materials as well. Examples include reaction products obtained by maleylating, epoxidizing or hydrogenizing the double bonds present in the side chains. These reaction products can optionally be reacted further with water or an alcohol which results in the formation of diols or α-hydroxyethers in the side chains. Other suitable derivatives of cardol and/or cardanol can also be obtained by reacting these compounds or the compounds obtained by maleylating, epoxidizing or hydrogenising with an aldehyde.

These substituted phenols and resorcinols can be oligomerized using known processes, such as e.g. by reaction with formaldehyde or acid, in particular glyoxylic acid. Due to their hydroxyl functionality, both the monomers and the oligomers are suitable for a reaction with isocyanate and in some applications they can partly or fully replace e.g. condensation products of phenol and formaldehyde.

The polyol component of the present invention comprises at least one compound selected from the group consisting of cardol, cardanol or derivatives or oligomers thereof, or mixtures thereof in an amount of 5 to 100 wt.-%, preferably 7 to 70 wt.-%. In addition to the compound selected from the group consisting of cardol, cardanol or derivatives or oligomers thereof, the polyol component of the present invention can comprise one or more plasticizers containing hydroxyl groups and/or a condensation product of a phenol and formaldehyde and/or one or more diluting agents containing hydroxyl groups.

Substances usually used in polyurethane chemistry for this purpose, such as e.g. long-chain aliphatic alcohols and derivatives thereof, such as hydroxyl-functional polyethers and polyesters, in particular castor oil and its derivatives are suitable plasticizers containing hydroxyl groups. Using these functional plasticizers, excellent elastic coatings exhibiting the desired slow release properties can be obtained without the plasticizers being able to migrate from the coating and thus causing subsequent embrittlement.

Depending on the desired properties, the polyol component according to the present invention can optionally comprise condensation products of phenols and aldehydes, such as novolaks and so-called benzylether resins of the general formula

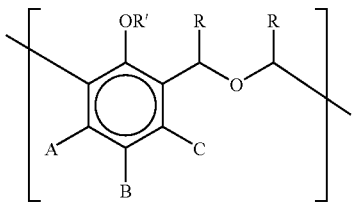

A, B and C can be the same or different and can each represent a hydrogen or halogen atom, a $C_1$-$C_{10}$ hydrocarbon group, preferably methyl, butyl, octyl or nonyl, more preferably a methyl group, a methylol group, or an isopropylidene phenol or methylene phenol group. If A, B or C have a hydroxy functionality, it can be etherified with a $C_1$-$C_{10}$ hydrocarbon group.

R can be a hydrogen atom, but also a $C_1$-$C_8$ hydrocarbon group, preferably, R is a hydrogen atom. R' can be a hydrogen atom or a $C_1$-$C_{10}$ hydrocarbon group, preferably a methyl, ethyl or butyl group.

As was mentioned above, in addition to the at least one compound selected from the group consisting of cardol, cardanol or derivatives or oligomers thereof, the polyol component according to the present invention can also comprise a condensation product of a phenol and an aldehyde. Alternatively, the polyol component according to the present invention can also be provided by condensing at least one compound selected from the group consisting of cardol, cardanol or derivatives or oligomers thereof into the condensation products described above in an amount of 5 to 95%. Furthermore, the two polyol components prepared according to the present invention can be used in combination as well.

For adjusting the viscosity and modifying the coating material, common diluting agents used in polyurethane chemistry can optionally be used. They may or may not have hydroxy functionality. Examples include glycerin, ethylene glycol, diethylene glycol, butane diol, diacetone alcohol and butanol.

In order to avoid the undesired formation of bubbles from the side reaction of the isocyanates with traces of water, further common additives can be added to the polyol component of the present invention, such as drying agents (for example zeolites or ortho-formic acid esters) or other molecular sieves. Wetting additives and flow-control additives (for example silicone-based additives such as polysiloxanes) can optionally also be added.

Aliphatic, aromatic and heterocyclic isocyanates having at least two isocyanate groups in a molecule or oligomers or polymers thereof can be used as the isocyanate component for the preparation of the polyurethane coating according to the present invention which is applied to granular materials.

Examples include toluene-2,4-diisocyanate, toluene-2,6-diisocyanate, 3-phenyl-2-ethylene diisocyanate, 1,5-naphthalene diisocyanate, cumene-2,4-diisocyanate, 4-methoxy-1,3-diphenyl diisocyanate, 4-chloro-1,3-phenyl diisocyanate, diphenylmethane-4,4'-diisocyanate, diphenylmethane-2,4'-diisocyanate, diphenylmethane-2,2'-diisocyanate, 4-bromo-1,3-phenyl diisocyanate, 4-ethoxy-1,3-phenyl diisocyanate, 2,4'-diisocyanate-diphenyl ether, 5,6-dimethyl-1,3-phenyl diisocyanate, 2,4-dimethyl-1,3-phenyl diisocyanate, 4,4-diisocyanatodiphenylether, 4,6-dimethyl-1,3-phenyl diisocyanate, 9,10-anthracene diisocyanate, 2,4,6-toluene triisocyanate, 2,4,4'-triisocyanatodiphenylether, 1,4-tetramethylene diisocyanate, 1,6-hexamethylene diisocyanate, 1,10-decamethylene diisocyanate, 1,3-cyclohexylene diisocyanate, 4,4'-methylene-bis-(cyclo-hexylisocyanate), xylene diisocyanate, 1-isocyanato-3-methylisocyanato-3,5,5-trimethylcyclohexane (isophorone diisocyanate), 1,3-bis (isocyanato-1-methylethyl)benzene (m-TMXDI), 1,4-bis (isocyanato-1-methylethyl)benzene (p-TMXDI).

Aromatic isocyanates such as toluene diisocyanate, diphenylmethane diisocyanate etc. and oligomers based thereon that are commonly used in the art are preferred.

The coating of the granulates is conveniently carried out in a rotating drum wherein the material to be coated is kept moving during the entire coating process. Other processes, such as e.g. coating in a fluidized bed are possible as well.

The polyol and isocyanate components of the present invention are added to the material to be coated in admixture or separately. This can be done continuously or in batches. Preferably, amines are used as catalysts to accelerate the curing reaction. The catalyst can be added to the polyol component either in gaseous form or as a gaseous mixture with air or an inert gas, or in liquid form.

The amount of coating material depends on the desired duration of effectiveness or the release rate and the particle size of the granulate, and is usually between 3 and 15 wt.-% based on the material to be coated. Since the coating can be carried out at room temperature, even materials which cause dangerous reactions at elevated temperatures, such as ammonium nitrate, can be coated without any problems.

When catalyst gassing technology is applied, low-boiling amines such as for example trimethyl amine, triethyl amine, dimethylethyl amine or dimethylisopropyl amine, are preferably used.

If the catalyst is to be added to the polyol component of the present invention, higher boiling amines such as e.g. triethanol amine, vinyl imidazole, but also all other catalysts common in polyurethane chemistry, such as e.g. tin-organic compounds, such as e.g. dibutyltin laurate, can be used as well.

The coated granular material of the present invention can be water-soluble. Examples of granular materials include fertilizers, crop protection agents, insecticides, pesticides, fungicides, drying agents and suitable mixtures thereof. So-called NPK fertilizers are especially suitable fertilizers.

The following examples are intended to describe the invention in more detail without restricting it in any way.

EXAMPLE 1

Preparation of a Precondensate with Cardol/Cardanol from Modified Cashew Nut Oil 412 g phenol, 45.8 g decarboxylated and distilled cashew nut oil, 198 g paraformaldehyde and 0.6 g zinc acetate are mixed in a reaction flask, refluxed to 115° C. and held at that temperature for one hour. The resulting reaction water is subsequently distilled off. The yield is about 85%.

EXAMPLE 2

Comparative

Preparation of a Phenolic Resin Precondensate 458 g phenol, 198 g paraformaldehyde and 0.5 g zinc acetate are mixed in a reaction flask, refluxed to 115° C. and held at that temperature for one hour. The resulting reaction water is subsequently distilled off. The yield is about 85%.

EXAMPLE 3

Preparation of Polyol Formulations

|  | Polyol formulation No. | | | | | | |
| --- | --- | --- | --- | --- | --- | --- | --- |
|  | 1* | 2 | 3 | 4 | 5 | 6 | 7 |
| Phenolic resin from Example 1 |  | 25 |  |  |  |  |  |
| Phenolic resin from Example 2 | 25 |  |  | 15 | 15 | 15 |  |
| Cardol/cardanol oligomer |  |  | 25 |  | 30 | 10 | 12.5 |
| Cardol/cardanol from cashew nut oil |  |  |  | 10 |  |  | 12.5 |
| Castor oil | 60 | 60 | 60 | 60 | 50 | 60 | 60 |
| Diethylene glycol | 10 | 10 | 10 | 10 |  |  | 10 |
| Glycerin |  |  |  |  |  | 10 |  |
| Molecular sieve | 5 | 5 | 5 | 5 | 5 | 5 | 5 |

*according to prior art EP 230 601

EXAMPLE 4

Provision of the Isocyanate Component

The isocyanate component consists of a mixture of oligomers and isomers on the basis of diphenylmethane diisocyanate with an isocyanate content of 29 to 33% and a functionality of about 2.7.

EXAMPLE 5

Coating of Fertilizer Granulate

A commercially available NPK fertilizer granulate with an average grain size of 4 mm was coated. Coating was carried out in a rotating vessel at room temperature. The fertilizer was kept moving during the entire coating process. The polyol component was mixed with the isocyanate component in a ratio of 1:1.

This mixture was slowly added to the fertilizer, spread homogeneously and cured using an amine catalyst (triethylamine).

The coating material was used in an amount of 10 wt.-% based on the fertilizer granulate. This amount was applied to the granulate in several cycles in the manner described above. After each coating process, the resin was hardened in order to reduce tackiness. A number of 3 to 6 cycles turned out to be suitable.

EXAMPLE 6

Determination of the Release of Active Ingredient of the Coated Fertilizer Granulate For determining the release of active ingredient, 10 g of the coated fertilizer were added to 1,000 ml distilled water and kept moving by means of a magnetic stirrer. The amount of active ingredient that had dissolved was determined on the basis of the increase in electric conductivity of the water. The amount of active ingredient dissolved is calculated by a comparison with uncoated fertilizer granulate. A commercially available NPK fertilizer with an effectiveness of 3 months under common soil conditions is used as a comparison.

The values given describe the amount of dissolved fertilizer in weight percent, based on the amount of fertilizer granulate used which has been prepared according to Example 5 using the different polyol formulations described in Example 3.

| Release in | Fertilizer granulate containing polyol formulation no. | | | | | | | Com-parison |
|---|---|---|---|---|---|---|---|---|
| wt.-% after | 1* | 2 | 3 | 4 | 5 | 6 | 7 | |
| 24 h | 4.5 | 1.8 | 1.9 | 2.4 | 1.1 | 1.5 | 1.3 | 2.5 |
| 48 h | 8.4 | 4.9 | 5.2 | 7.1 | 2.2 | 4.6 | 3.8 | 8.2 |
| 1 week | 27.4 | 12.9 | 14.1 | 21.9 | 9.9 | 12.2 | 14.5 | 28.3 |
| 2 weeks | 43.0 | 25.4 | 22.7 | 39.6 | 22.8 | 25.0 | 27.3 | 42.8 |
| 3 weeks | 55.2 | 37.2 | 31.1 | 49.1 | 34.2 | 33.5 | 40.2 | 56.1 |
| 4 weeks | 65.1 | 48.1 | 47.0 | 60.1 | 47.3 | 49.6 | 48.1 | 64.3 |
| 6 weeks | 74.2 | 58.2 | 63.0 | 71.5 | 57.7 | 63.5 | 54.2 | 72.6 |

*according to prior art EP 230 601

The invention claimed is:

1. A granular material coated with a resin comprising the reaction product of:
    (a) a polyol component, wherein the polyol component comprises a condensation product of:
        (i) a phenol, wherein the phenol does not include a cardanol;
        (ii) an aldehyde; and
        (iii) cardanol; and
    (b) an isocyanate component.

2. The coated granular material according to claim 1, wherein the resin comprises the reaction product of:
    (a) the polyol component;
    (b) the isocyanate component; and
    (c) a plasticizer containing hydroxyl groups and/or a diluting agent containing hydroxyl groups and/or further drying agents and/or molecular sieves and/or wetting additives and/or flow-control additives.

3. The coated granular material according to claim 1, wherein the isocyanate component of the resin is an aliphatic, aromatic or heterocyclic isocyanate having at least 2 isocyanate groups in one molecule or oligomers or polymers thereof.

4. The coated granular material according to claim 3, wherein the isocyanate component is toluene diisocyanate, diphenylmethane diisocyanate or an oligomer based thereon.

5. The coated granular material according to claim 1, wherein the granular material is water-soluble.

6. The coated granular material according to claim 1, selected from the group consisting of fertilizers, crop protection agents, insecticides, pesticides, fungicides, drying agents and suitable mixtures thereof.

7. The coated granular material according to claim 1, wherein the granular material is an NPK fertilizer.

8. The coated granular material according to claim 1, wherein the amount of the coating is 3 to 15 wt.-% based on the amount of the granular material.

9. The coated granular material according to claim 1, wherein the grain size of the granular material is 1 to 10 mm.

10. A method for the preparation of a coated granular material as defined in claim 1, comprising the steps of:
    (a) providing a granular material;
    (b) providing the polyol component and the isocyanate component;
    (c) optionally mixing the polyol component and the isocyanate component;
    (d) adding the mixture of step (c) or the polyol component and the isocyanate component as individual substances to the provided granular material and generating a coating on the granular material;
    (e) curing the mixture of step (d); and
    (f) optionally repeating steps (d) and (e) to apply the coating to the granular material in several cycles.

11. The method according to claim 10, wherein 2 to 10 coating cycles are carried out.

12. The method according to claim 10, wherein an amine catalyst is used for the curing in step (e).

13. The coated granular material according to claim 1, wherein the resin comprises the reaction product of:
    (a) the polyol component;
    (b) the isocyanate component; and
    (c) cardanol.

14. The coated granular material according to claim 1, wherein the resin comprises the reaction product of:
    (a) the polyol component;
    (b) the isocyanate component; and
    (c) oligomers which remain at the bottom of a reaction apparatus after cashew nut oil has been heated and cardol and cardanol have been distilled off.

15. The coated granular material according to claim 1, wherein the polyol component comprises a condensation product of:
    (i) phenol;
    (ii) formaldehyde; and
    (iii) cardanol.

16. A granular material coated with a resin comprising the reaction product of:
    (a) a polyol component, wherein the polyol component comprises a condensation product of:
        (i) a phenol; and
        (ii) an aldehyde; and
    (b) an isocyanate component; and
    (c) cardanol.

17. The coated granular material according to claim 16, wherein the condensation product of a phenol and an aldehyde comprises novolaks or benzyl ether resins.

18. The coated granular material according to claim 16, wherein the resin comprises the reaction product of:
    (a) the polyol component;
    (b) the isocyanate component; and
    (c) oligomers which remain at the bottom of a reaction apparatus after cashew nut oil has been heated and cardol and cardanol have been distilled off.

19. The coated granular material according to claim 16, wherein the resin comprises the reaction product of:
    (a) the polyol component;
    (b) the isocyanate component;
    (c) cardanol; and
    (d) a plasticizer containing hydroxyl groups and/or a diluting agent containing hydroxyl groups and/or further drying agents and/or molecular sieves and/or wetting additives and/or flow-control additives.

20. The coated granular material according to claim 16, wherein the isocyanate component comprises a mixture of oligomers and isomers on the basis of diphenylmethane diisocyanate.

* * * * *